United States Patent
Simpson et al.

(10) Patent No.: US 8,587,798 B2
(45) Date of Patent: Nov. 19, 2013

(54) REPLACEMENT COMPONENT FOR A PRINTING DEVICE

(75) Inventors: Shell S. Simpson, Boise, ID (US); Rajeev Pandey, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3128 days.

(21) Appl. No.: 10/903,157

(22) Filed: Jul. 30, 2004

(65) Prior Publication Data

US 2006/0023249 A1 Feb. 2, 2006

(51) Int. Cl.
*G06F 3/12* (2006.01)
*G06K 15/00* (2006.01)

(52) U.S. Cl.
USPC .......... 358/1.15; 358/1.1; 358/1.13; 358/1.14

(58) Field of Classification Search
None
See application file for complete search history.

(56) References Cited

U.S. PATENT DOCUMENTS

| | | | |
|---|---|---|---|
| 5,314,774 A * | 5/1994 | Camis | 430/47.2 |
| 6,233,408 B1 | 5/2001 | Allen | |
| 6,625,402 B2 | 9/2003 | Takemoto | |
| 6,629,134 B2 | 9/2003 | Hayward et al. | |
| 6,719,197 B2 * | 4/2004 | Yajima | 235/375 |
| 6,953,235 B2 * | 10/2005 | Silverbrook | 347/19 |
| 7,043,523 B2 * | 5/2006 | Haines et al. | 709/203 |
| 7,130,068 B1 * | 10/2006 | Ohta | 358/1.15 |
| 2006/0023249 A1 * | 2/2006 | Simpson | 358/1.15 |
| 2006/0153616 A1 * | 7/2006 | Hofmann | 400/62 |

* cited by examiner

Primary Examiner — Vincent Rudolph
Assistant Examiner — Marcus T Riley

(57) ABSTRACT

A printing device can transmit a remote procedure call message to invoke a network device. The RPC message includes data read from a memory that is an integrated part of a replacement component.

51 Claims, 11 Drawing Sheets

|   | Cartridge serial number | Random number |
|---|---|---|
| 1 | 12456 | 938230 |
| 2 | 21456 | 3964049 |
| ...... | ....... | ....... |
| N | 32145 | 8675309 |

REPLACEMENT COMPONENT FOR A PRINTING DEVICE

BACKGROUND OF THE INVENTION

As used herein, the phrase "printing device" refers to any device that includes a printing function. Thus, for example, the phrase "printing device" may refer to an inkjet printer, a laser printer, a commercial printing press, a multifunction peripheral (MFP) that includes a printing function, etc.

Many types of printing devices are equipped with replaceable components each having a life cycle during which the replaceable component is functional. At the end of the life cycle of a replaceable component, the component is often replaced for the printing device to continue to function properly.

For example, a print cartridge is installed in many types of printing devices to provide a supply of print material (e.g., toner or ink) for the printing process. As documents are printed, the print material is gradually depleted. When the supply of print material is exhausted, the print cartridge is typically replaced.

A user who wishes to obtain a replacement component, such as a print cartridge, for a printing device may purchase the component from a supplier. New and innovative ways are needed to enable the supplier to add value to these components for their customers.

DESCRIPTION

As used herein, the phrase "network service" refers is one or more functions that can be performed by a server system at the request of a client device. As is well known in the art, many client/server systems follow a "remote procedure call" (RPC) protocol to allow a client to remotely invoke a network service that is provided by a server system. The Simple Object Access Protocol (SOAP) is one example of a RPC protocol. Other RPC protocols are provided by the "Common Object Request Broker Architecture" (CORBA), the "Distributed Computing Environment" remote procedure call (DCE-RPC), MS-RPC, XML-RPC, the "Distributed Component Object Model" (DCOM), and the "Remote Method Invocation" (RMI) protocol. It is noted that all these systems and standards may be used to implemented embodiments of the inventions.

As used herein, the word "credential" refers to data that is sent by a client to a server in order to demonstrate to the server that the client is entitled and/or authorized to access an aspect of a network service provided by the server. The following provides a non-limiting list of credential types that are presently used in the art:

Example credential type #1: A randomly generated number that is known to both the client and the server (i.e., the random number is a shared secret).

Example credential type #2: A large number (e.g., a number that requires more than 2000 bits to represent) that that is known to both the client and the server (i.e., the large number is a shared secret).

Example credential type #3: A pair of numbers. The first number is an encrypted version of the second number. The server can use a shared secret (e.g., a private cryptographic key) to decrypt the first number and then determines if the first number matches the second number in order to verify the credential.

Example credential type #4: A client identifier (e.g., a serial number) encrypted with a shared secret (e.g., a private cryptographic key) that is known to both the client and the server. The shared secret is not passed between the client and the server.

Figure 1:
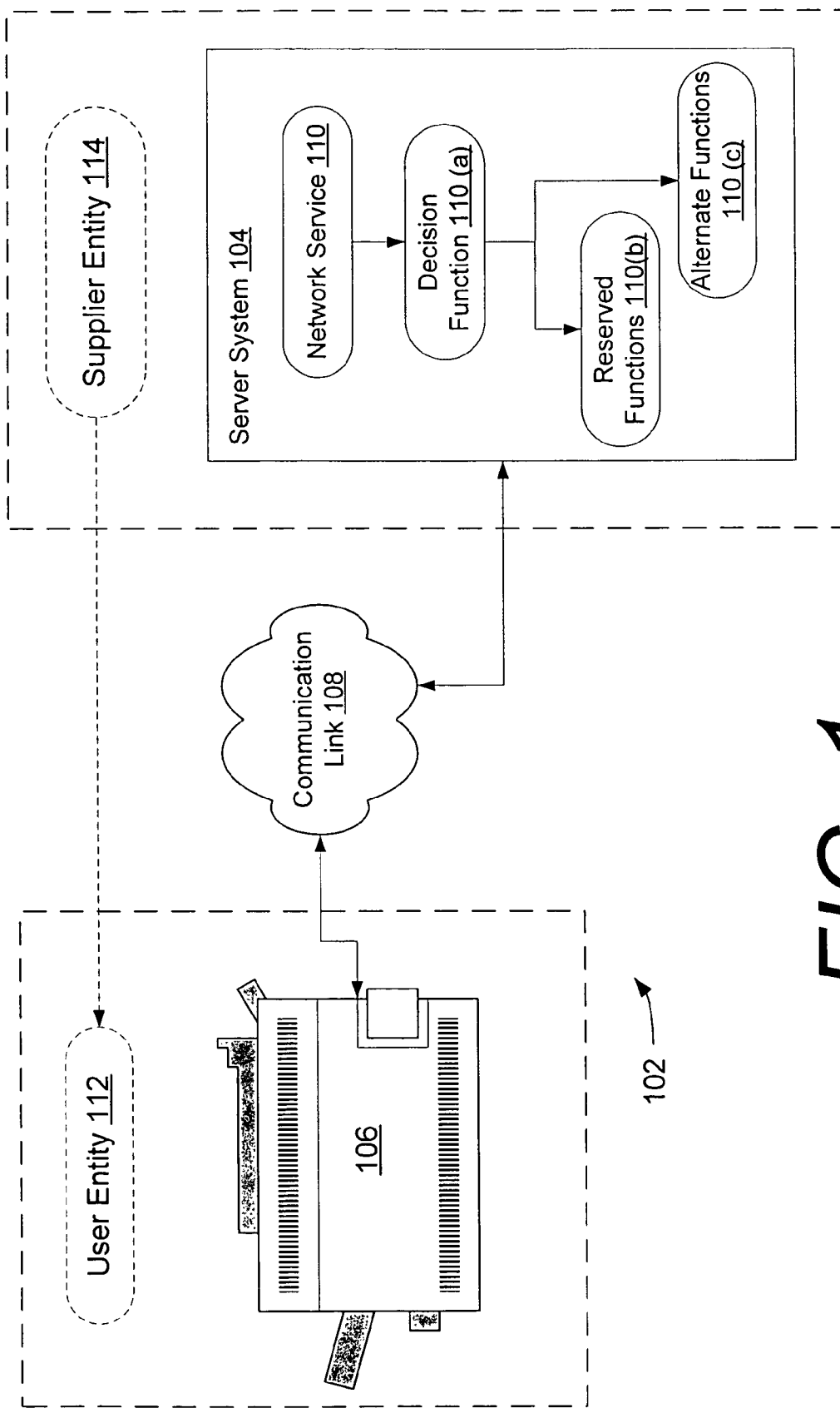
FIG. 1 is a high level block diagram of a computing system.

FIG. 1 is a high level block diagram of a computing system 102 that is in accordance with one example embodiment of the invention. As shown, the computing system 102 includes a server system 104 and a printing device 106. Each of these devices is able to communicate over a communication link 108. The communication link 108 may represent the Public Internet, for example.

It is noted for the later discussion that the computing system 102 may include other printing devices that can also communicate with the server system 104 over the communication link 108. This may be especially true in implementations wherein the communication link 108 is the public Internet.

The printing device 106, in this illustrative embodiment, is a laser printer of a type that uses a replaceable print cartridge that includes toner. From time to time the print cartridge may need to be replaced and is typically replaced in the field.

For the discussion that follows, we will assume that there exists a user entity 112 and a supplier entity 114. The user entity 112 may represent a business or an individual that owns and operates the printing device 106. The supplier entity 114 may represent an enterprise that both maintains the server system 104 and supplies replacement printing device components to its customers. The user entity 112, for example, may purchase replacement print cartridges from the supplier entity 114 for use in the printing device 106.

We will further assume that the supplier entity 114 provides a type of print cartridge (illustrated in FIG. 2) that includes a memory for storing electronic data. As is discussed further below, prior to this type of print cartridge being provided to a user, the supplier entity 114 issues a "cartridge credential" to the print cartridge and stores this data in the memory of the print cartridge. For ease of discussion, we will refer to a print cartridge that has been issued a cartridge credential by the supplier entity 114 as an "authorized print cartridge".

A print cartridge that has not been issued a cartridge credential by the supplier entity 114 may be referred to as an "unauthorized print cartridge". This is true even if the print cartridge is an exact replica of an authorized print cartridge.

In the next part of the discussion we will assume that, from the supplier's perspective, there are two mutually exclusive categories of client devices that are able to communicate with the server system 104. A client device that falls into the first category we will refer to herein as an "authorized printing device". An authorized printing device refers to any printing device that has presently installed an authorized print cartridge.

A client device that falls into the second category we will refer to herein as an "unauthorized client device". An "unauthorized client device" refers to any client device that does not qualify as an authorized printing device. Thus, for example, a printing device that can interact with the server system 104 as a client but does not have presently installed an authorized print cartridge is considered an "unauthorized client device".

As indicated in FIG. 1, the server system 104 provides a network service 110. A client device can invoke the network service 110 by transmitting a RPC message that adheres to certain policies to the server system 104. In the present embodiment, the RPC message may be transmitted to the server system 104 using an HTTP protocol and the RPC message may be in accordance with a version of SOAP. In other embodiments, however, other protocols may be used, such as those provided by CORBA, DCE-RPC, MS-RPC, XML-RPC, DCOM, RMI, etc. In some embodiments, the RPC message may be in accordance with an RPC message that has yet to be generally used in the computing arts as of the filing date of this application.

In this embodiment, the network service 110 includes a "decision function" 110(a), a reserved set of functions 110(b), and an alternate set of functions 110(c). Generally speaking, when a RPC message is received to invoke the network service 110, the server system 104 initially performs the decision function 110(a) to determine if the information included in the RPC message demonstrates, to an acceptable level of certainty, that the originator of the message is an "authorized printing device" (i.e., a printing device that has presently installed an authorized print cartridge).

If the server system 104 concludes that the originator of the RPC message is an authorized printing device, the reserved set of functions 110(b) is invoked in response to the RPC message. Otherwise, the alternate set of functions 110(c) is invoked. In this manner, the server system 104 attempts to limit access to the reserved set of functions 110(b) to authorized printing devices. This is in accordance with the intent of the supplier entity 114 who wishes to limit access to the reserved set of functions 110 (b) to those customers that purchase an authorized print cartridge.

In the present embodiment, an authorized printing device can demonstrate to the server device 104 that it is indeed an authorized printing device by transmitting to the server system 104 a RPC message that specifies certain information. In this example, this information includes:
 1. The serial number of the printing device; and
 2. A cartridge credential.

Construction of an Authorized Print Cartridge

Figure 2:
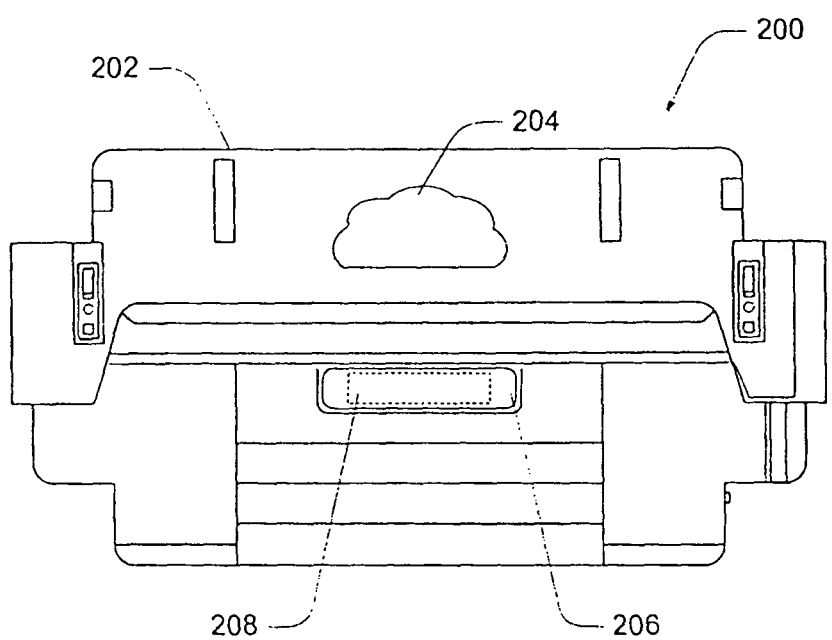
FIG. 2 illustrates an example of a print cartridge that includes a memory.

FIG. 2 illustrates an example of an authorized print cartridge 200 that represents a type of print cartridge that may be supplied by the supplier entity 114 to, for example, the user entity 112. For the discussion that follows, we will assume that this particular type of print cartridge is compatible for use in the printing device 106.

As shown in FIG. 2, the print cartridge 200 includes a housing 202 that contains a supply of toner material 204. The print cartridge 200 further includes a non-volatile memory 208 that is in an integrated part of the print cartridge 200. In this example, the print cartridge memory 208 is permanently attached to an outer surface of the housing 202 as shown.

It is noted that in some specific implementations, for example, the print cartridge memory 208 is of a type that can be accessed over a wireless communication link. In these implementations the print cartridge memory 208 may represent a radio frequency identification (RFID) tag, for example. In other implementations, the memory 208 may be of a type that can be accessed via a hard-wired connection.

Authorized Print Cartridge Configuration

Prior to a print cartridge of the type just illustrated being provided to a customer, the supplier entity 114 issues a cartridge credential to the print cartridge and then stores this data in the print cartridge memory. In this embodiment, the cartridge credential is unique for each cartridge and includes the following:
 1. A randomly generated number; and
 2. A unique serial number assigned to the print cartridge.

Figure 3:
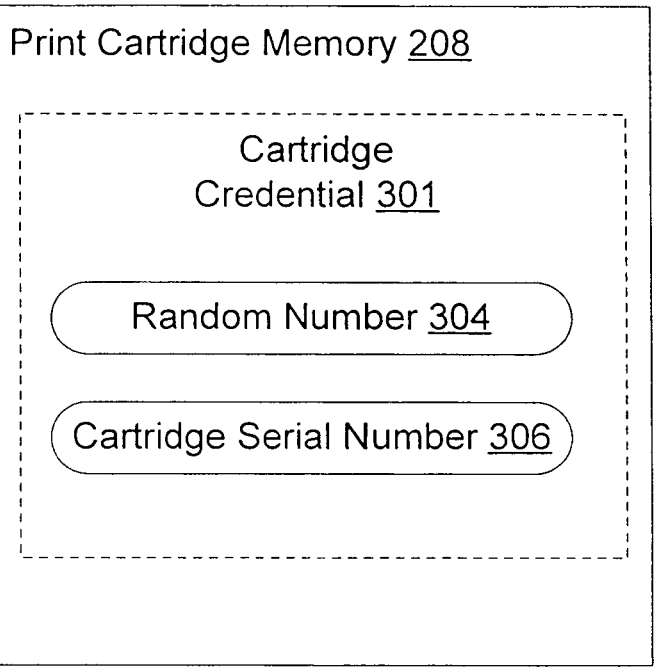
FIG. 3 illustrates the data that may be stored in a print cartridge memory.

FIG. 3 illustrates, for example, a cartridge credential 301 that is stored in the print cartridge memory 208 prior to the supplier entity 114 providing the print cartridge 200 to a customer. As shown, the cartridge credential 301 includes a random number 302 and a unique serial number 304. The unique serial number 304 is assigned to the print cartridge 200 and can serve later to uniquely identify this particular cartridge over other print cartridges that the supplier entity 114 provides. In some specific implementations, the random number 302 and/or the print cartridge serial number 304 may be stored in the print cartridge memory 208 in an encrypted form.

It is noted for the later discussion that, in this example, the supplier entity 114 takes steps to keep a cartridge credential secret. Thus, for example, the supplier entity 114 would not publish an issued cartridge credential to un-trusted third parties.

Construction of Example Server System

Figure 4A:
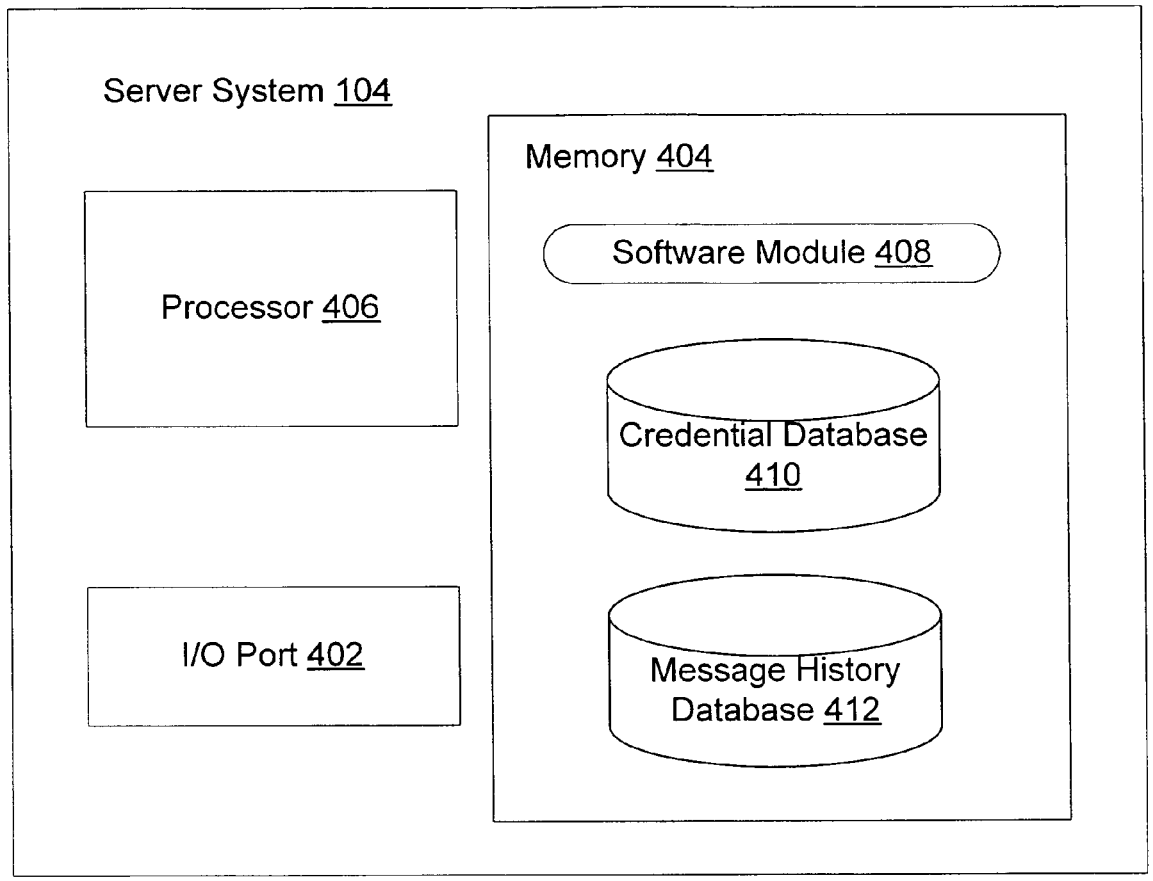
FIG. 4A is a high-level block diagram of a server system.

FIG. 4A is a high-level block diagram illustrating one example of how the server system 104 may be constructed. As shown in FIG. 4A, the server system 104 includes an input-output (I/O) port 402, a memory 404 and a processor 406.

The I/O port 402 is generally any hardware, firmware, or gate level logic enabling the server system 104 to communicate over a network. The network could be any type of network, such as Ethernet, Token Ring or Banyan, for example. In some specific implementations the network may interconnect with the public internet and client devices can communicate with the server system 104 over the public internet.

The memory 404 is generally any memory device or set of memory devices enabling the server system 104 to store certain electronic information. This information includes a software module 408 as well as a first set of records organized within a "cartridge credential" database 410 and a second set of records organized within a "message history" database 412.

Figure 4B:
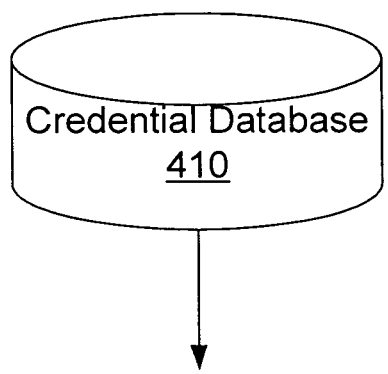
FIG. 4B illustrates an example of the records that may be present in a cartridge credential database.

The cartridge credential database 410 maintains a record of each cartridge credential that the supplier entity 114 has issued to a print cartridge. Thus, for example, the cartridge credential database 410 would include a record that specifies the cartridge credential 301 that was issued to the print cartridge 200. As discussed further below, this particular database enables the server system 104 to recognize a cartridge credential in a RPC message as one that has actually been issued by the supplier entity 114 to a print cartridge. A cartridge credential specified by a RPC message that is not listed in the cartridge credential database 410 is considered invalid. FIG. 4B illustrates some of the records that may be present in the cartridge credential database 410. As shown in FIG. 4B, for example, the cartridge credential database 410 includes a record of a cartridge credential that specifies a cartridge serial number of "12456" and a random number of "938230".

The message history database 412 maintains a record of some of the information that was included in previously received RPC messages to invoke the network service 110. As noted above, a RPC message to invoke the network service 110 may specify a cartridge credential (that includes a cartridge serial number and random number) as well as a printing device serial number. In the present embodiment, when an RPC message that includes this information is received, the server system 104 may place a record in the message history database 412 that specifies some of the information included in the RPC message. The record specifies the cartridge serial number (e.g., 12456) that is included in the cartridge credential as well as the printing device serial number.

Figure 4C:
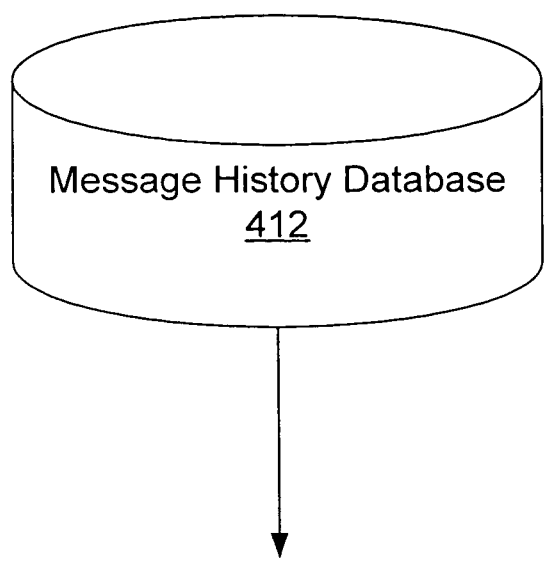
FIG. 4C illustrates an example of the records that may be present in the message history database for one particular cartridge credential.

FIG. 4C illustrates an example of the records that may be present in the message history database 412 as a result of records being a particular cartridge credential being passed five different times in five different RPC message to the server system 104. In this example, the cartridge credential specifies a cartridge serial number set equal to "12456".

For the later discussion, it is noted that one purpose of the message history database 412 is to allow the server system 104 to determine how many different printing devices have passed the same cartridge credential to the server system 104. The five records shown in FIG. 4C, for example, each specify a different printing device serial number. Thus, presumably five different printing devices have passed a copy of this same credential to the server system 104.

The processor 406 is generally any processor device or set of processor devices that can execute the software module 408. The software module 408 enables the server system 104 to provide the network service 110 as well as to maintain and update the two databases.

Construction of an Example Printing Device

Figure 5:
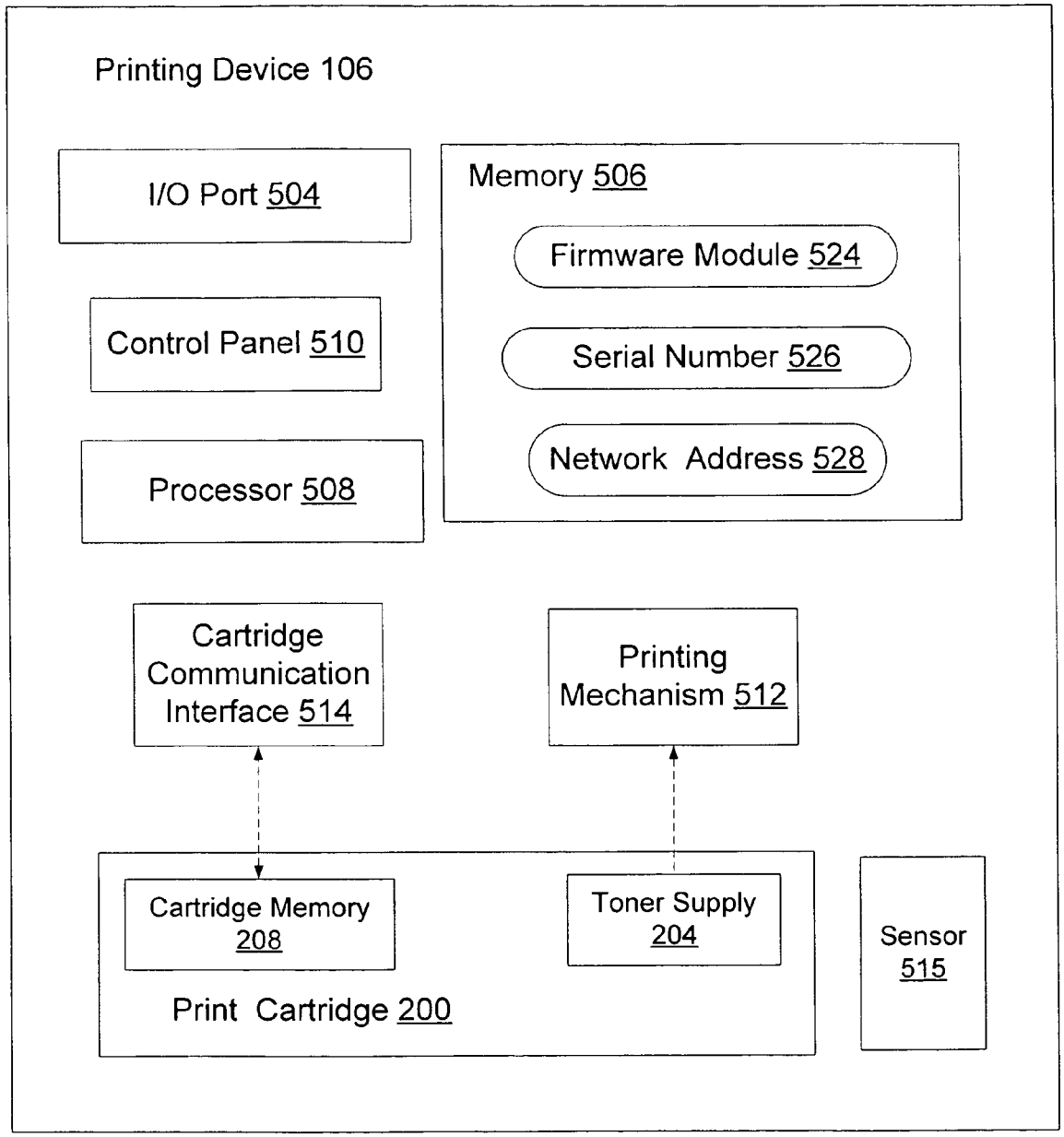
FIG. 5 is a high level block diagram of a printing device.

FIG. 5 is a high level block diagram illustrating one example of how the printing device 106 may be constructed in accordance with an embodiment of the invention. In FIG. 5 we assume that the supplier entity 114 has provided the authorized print cartridge 200 to the user entity 112 and that this cartridge has been installed in the printing device 106. Thus, the printing device 106 configured as shown in FIG. 5 qualifies as an "authorized printing device" and is entitled to invoke the reserved set of functions 110 (b) of the network service 110.

As shown in FIG. 5, the printing device 106 may include an I/O port 504, a memory 506, a processor 508, a local control panel 510, a printing mechanism 512, a cartridge memory communication interface 514, and a cartridge presence sensor 515.

The I/O port 504 is generally any hardware, firmware, or gate level logic enabling the printing device 106 to communicate over a network. The network could be any type of network, such as an Ethernet, Token Ring or Banyan. In some specific implementations, the network interconnects (via a firewall) with the public internet and the printing device 106 can communicate with the server system 104 through the firewall over the public internet.

The memory 506 is generally any memory device or set of memory devices enabling the printing device 106 to store certain information. In this embodiment, for example, the memory 506 stores a firmware module 524 that the processor 508 can execute. The firmware module 524 enables the printing device 106 to perform the acts that are described below in connection with FIG. 7.

Additionally, the memory 506 also stores a unique serial number 526 and a network address 528. The serial number 526 is assigned to the printing device 106 and can serve to uniquely identify the printing device 106 over other printing devices. The network address 528 is the network address of the destination of a RPC message to invoke the network service 110. It is noted that in some implementations the printing device serial number 526 and/or the network address 528 may be initially stored in the memory 506 by the manufacturer of the printing device 106. It is further noted that in implementations wherein the communication link 108 is the Public Internet, the network address 528 may represent a Public Internet address of the network service 110.

The local control panel 510 provides a user interface to the printing device 106 and may include one or more displays for displaying information and selectable options for controlling the operation of the printing device 106. Additionally, the local control panel 510 may provide one or more mechanisms (e.g., user input keys) for allowing a walk-up user to provide input.

The printing mechanism 512 enables the printing device 106 to controllably place marks on a print media. As previously noted, in this embodiment, the printing device is a laser printer. The printing mechanism 512 may therefore include a photoconductor and an exposure system for controllably exposing the photoconductor so as to create a latent image. During printing the printing mechanism 512 uses toner (that can be obtained from the installed print cartridge 200) to develop the latent image. The developed latent image may then be transferred (directly or indirectly) to a print media so as to generate printed output.

The cartridge memory communication interface 514 enables the printing device 106 to interface with the print cartridge memory 208 when the print cartridge 200 is installed. In implementations wherein the cartridge memory 208 can be accessed wirelessly, the cartridge communication interface 514 may include circuitry that enables the printing device to access the print cartridge memory 208 over a wireless communication link. If, however, the cartridge memory 208 is accessible via a hard-wired connection the cartridge communication interface 514 may include circuitry that temporarily establishes a hard-wired connection with the print cartridge memory 208 while the print cartridge 200 is installed in the printing device 106.

The cartridge presence sensor 515 enables the printing device 106 to detect when a print cartridge is installed in the printing device 106. Thus, for example, the cartridge presence sensor 515 may represent an optical or a mechanical switch that signals the processor 508 when a print cartridge is installed in the printing device 106.

Operation of Server System

Figure 6:
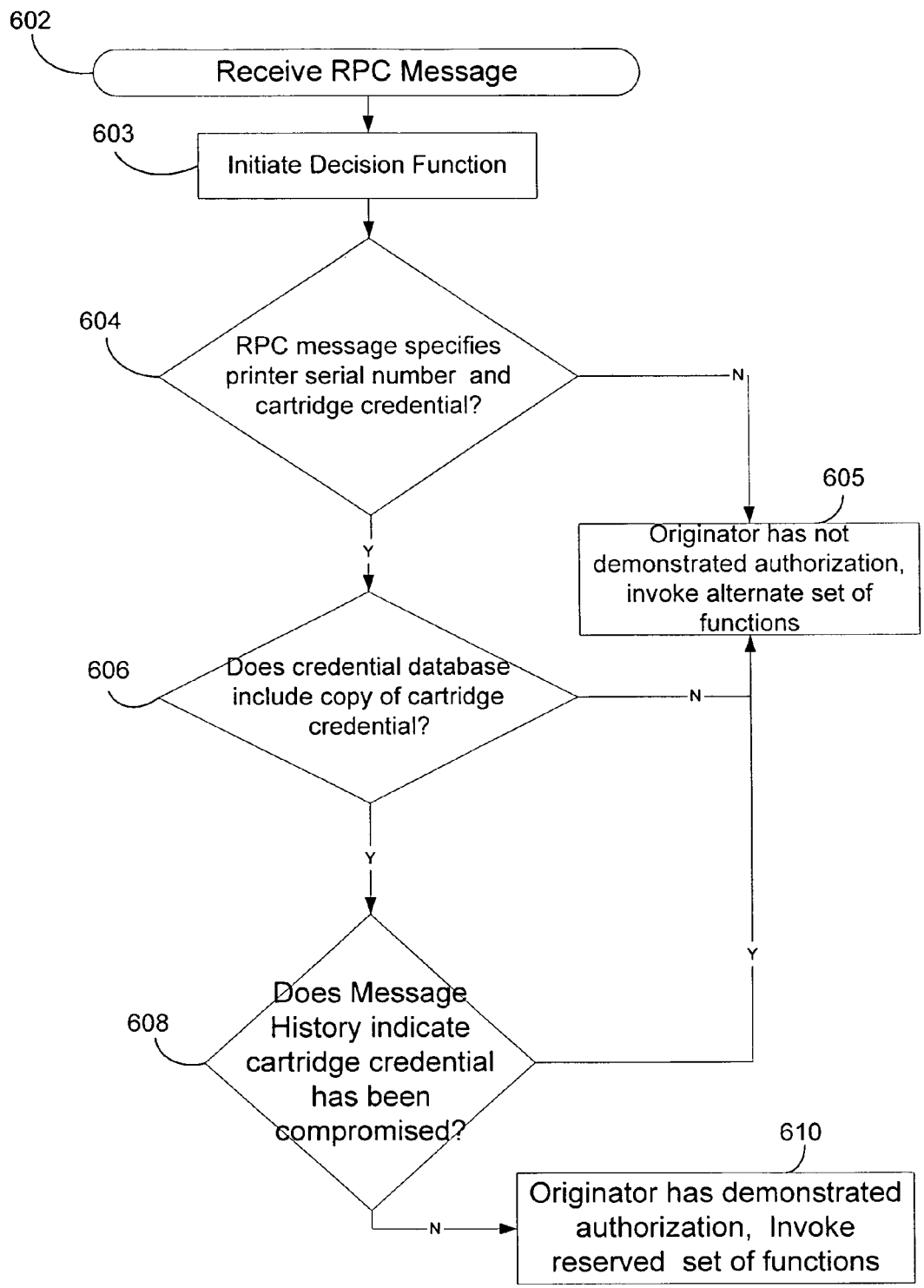
FIG. 6 illustrates one specific example of how the server system may operate upon receiving an RPC message to invoke a network service.

FIG. 6 illustrates one specific example of how the server system 104 may operate upon receiving a RPC message to invoke the network service 110. Referring now to FIG. 6, we assume the server system 104 receives a RPC message to invoke the network service 110 at step 602.

Upon receiving the RPC message, the server system 104 proceeds to perform the decision function 110(a) in order to decide whether to respond to the message by invoking the reserved set of functions 110(b) or the alternate set of functions 110(c) (step 603). As previously noted, this decision is based upon whether the information included in the RPC message demonstrates, to an acceptable degree of certainty, that the originator of the current RPC message is an authorized printing device. Steps 604-610 illustrate the operation of the server device 104 to perform the decision function 110(a).

At step 604, the server system 104 determines if the current RPC message specifies a printing device serial number and a cartridge credential. If any of this information is absent, then the alternate set of functions 110(c) is invoked as the information included in the RPC message does not demonstrate that the originator of the RPC message is an authorized printing device (step 605).

If, however, the RPC message does specify a printing device serial number and a cartridge credential, the server system 104 proceeds to decision step 606.

At step 606, the server system 104 determines if the database 410 includes a record of the cartridge credential that is specified by the current RPC message (step 606). If no such record exists, then the alternate set of functions 110(c) is invoked (step 605) as the cartridge credential is considered invalid and therefore unable to demonstrate that the originator of the RPC message is an authorized printing device (step 605).

If, however, such a record does exist, the server system 104 proceeds to decision step 608.

At step 608, the server system 104 uses the information included in the message history database 412 to detect if the current cartridge credential is being misused and/or the secrecy of the credential has been compromised in some way. If such a condition is detected, the alternate set of functions 110(c) is invoked (step 605) as the ability of cartridge credential to demonstrate that the originator of the RPC message is an authorized printing device is not considered trustworthy.

If, however, such a condition is not detected then the information specified by the RPC message is deemed to have demonstrated that the originator is indeed an authorized printing device. Accordingly, the server system 104 proceeds to invoke the reserved set of functions 110(b) in response to the RPC message (step 610).

Before we discuss one specific way the server system 104 could perform step 608, it is instructive to first consider the following scenario. Suppose a third party has obtained a copy of a valid cartridge credential. Suppose further the party is widely distributing print cartridges and that each of these cartridges include a copy of the now compromised credential. As noted above, these print cartridges are considered "unauthorized print cartridges" as the supplier entity 114 has not issued each of these cartridges their own credential. This is true even if each of the unauthorized print cartridges is an exact replica of an authorized print cartridge. Furthermore, the printing devices that use these unauthorized print cartridges are considered unauthorized client devices and are therefore not entitled to invoke the reserved set of functions 110(b).

Under this scenario there may be a significant number of printing devices in the field that are actually unauthorized client devices but nevertheless are able to pass a copy of a valid cartridge credential to the server system 104. Some or all of these unauthorized client devices may have attempted to invoke the network service 110 in the past by sending to the server system a RPC message that specified their own serial number and a copy of the compromised cartridge credential.

Step 608 may be performed to detect this scenario and may be based upon an assumption that it would be unlikely an authorized print cartridge would be installed in more than "N_thresh" different printing devices. Thus, if the message history database 412 indicates that more than "N_thresh" different printing devices has passed the same cartridge credential this would be an indication that the cartridge credential has been compromised.

Accordingly, the server system 104 may operate at step 608 to access the message history database 412 to determine if more than "N_thresh" different printers have passed the same cartridge credential as that specified by the current RPC message. If so, then the cartridge credential is considered untrustworthy and the server system 104 proceeds to invoke the alternate set of functions 605. If not, then the server system 104 may then proceed to invoke the reserved set of functions 110(b).

Reserved functions 110(b) and Alternate Functions 110(c)

It is note that the reserved set of functions 110(b) could represent any set of computer implemented functions that the supplier entity 114 wishes to provide to its customers in return for a purchase of an authorized print cartridge. These functions, therefore, could represent a set of computer implemented functions that a user of a printing device and/or a system administrator of a printing device could find useful.

In the present embodiment, for example, the server system 104 performs the reserved set of functions 110 by transmitting a first reply back to the originator of the RPC message (which is presumed to be an authorized printing device). The first reply may direct the authorized printing device to display a message that indicates the authorized print cartridge presently installed in the printing device originated from the supplier entity 114.

Additionally, in the present embodiment, the alternate set of functions 110(c) is performed by the server system 104 transmitting a second reply back to the originator of the RPC message. The second reply may direct the originator of the message to display a message that the RPC message failed.

Operation of a Printing Device to Invoke Network Service

Figure 7:
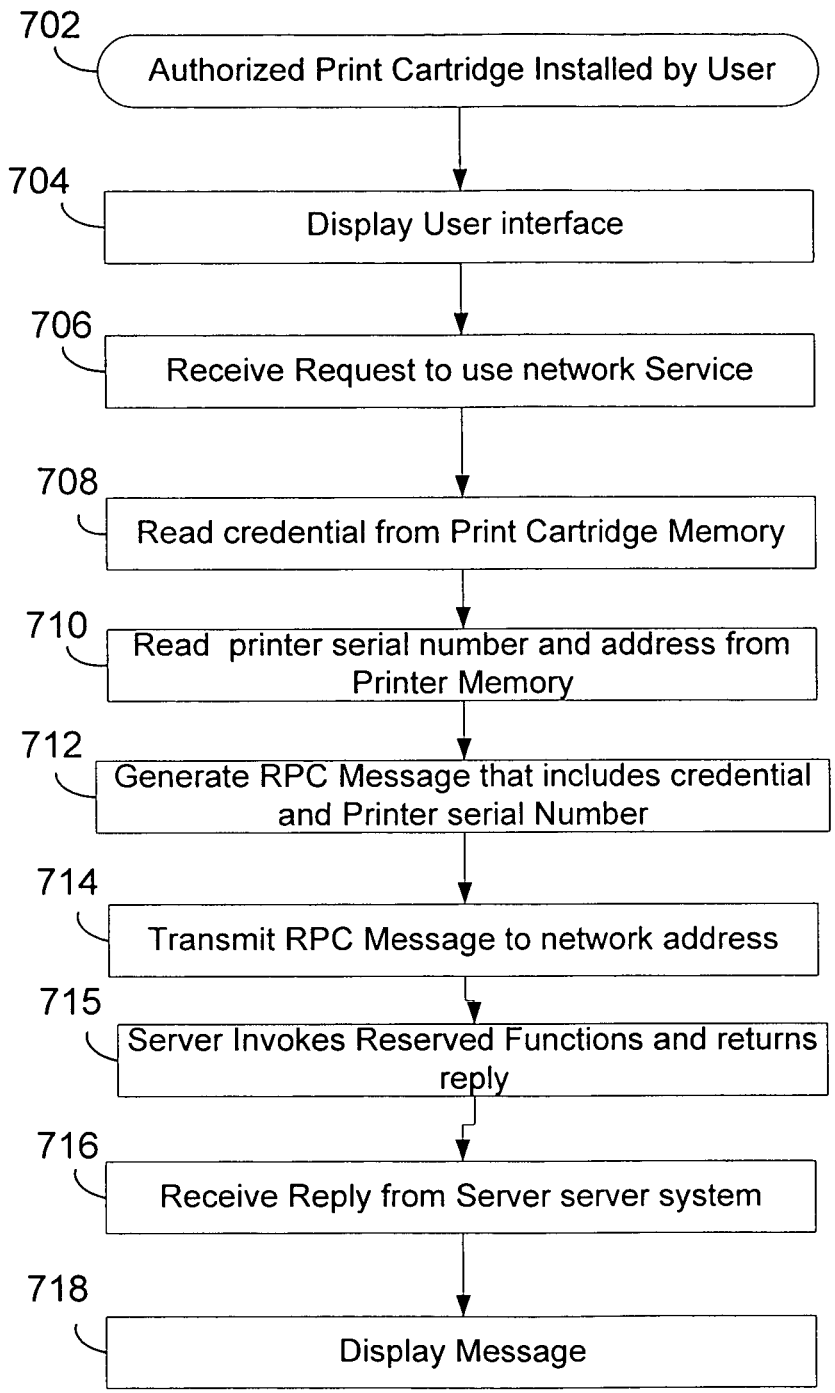
FIG. 7 is a flow diagram illustrating one specific example of how a printing device may operate to invoke a network service.

FIG. 7 is a flow diagram illustrating one specific example of how an authorized printing device may operate to invoke the network service 110. Referring now to FIG. 7, we assume that the user entity 112 obtains the authorized print cartridge 200 from the supplier entity 114 and then installs the cartridge into the printing device 106 (step 702). Thus, in this manner, the printing device 106 is "converted" into an authorized printing device.

At step 704, according to one embodiment, the printing device 106 displays a user interface on the control panel 510. This may be in a response to the printing device detecting the installation of the print cartridge, for example. The user interface may provide information that describes aspects of the network service and may include one or more selectable options for allowing a user to submit a request to invoke the network service 110.

At step 706, the printing device 106 receives a request from the user to access the network service 110. In response to this request, the printing device 106 proceeds to perform steps 708-714.

At step 708, the printing device 106 reads the cartridge credential 301 stored in the print cartridge memory 208.

At step 710, the printing device 106 reads the printing device serial number 526 and the network address 528 from the printing device memory 506.

At step 712, the printing device 106 generates a RPC message to invoke the network service 110. The message includes the cartridge credential 301 and the printing device serial number 526.

At step 714, the printing device 106 transmits the RPC message to the network address 528 so as to invoke the network service 110.

At step 715 the server system 104 receives the RPC message and concludes that the information included in the message demonstrates that the originator of the message is an authorized printing device. In response to this condition, the server system 104 invokes the reserved set of functions 110(b). This results in the server system 104 transmitting a reply back to the printing device 106. The reply directs the printing device 106 to display a message that informs the user that the print cartridge presently being used by the printing device originated from the supplier entity 114.

At step 716, the printing device 106 receives the reply from the server device 104. At step 718, the printing device 106 responds to the reply by displaying on the control panel 510 the message just described.

It should be noted that in alternative embodiments, the printing device 106 may be configured to automatically (i.e., without the need for user intervention) transmit the RPC message when certain conditions exist. For example, the printing device 106 may be configured to perform steps 708-714 automatically in response to detecting the installation of the print cartridge 200.

Figure 8:
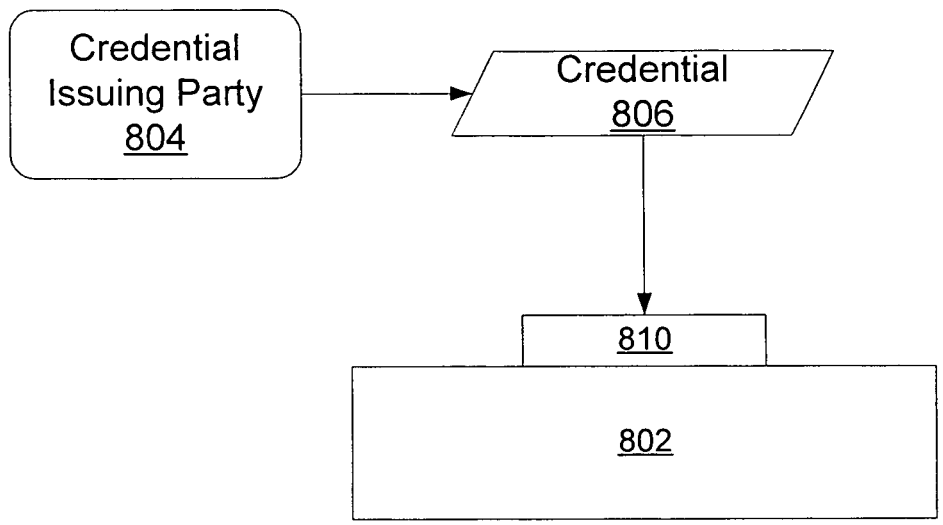
FIG. 8 illustrates a replacement component for a printing device.

FIG. 8 illustrates another embodiment of the invention in the form of a replacement component 802 for a printing device. As shown in FIG. 8, a party 804 issues a credential 806 to the component 802. The credential 806 is stored in a memory 810 of the component 802. The credential 806 is used by the printing device that receives the component 806 to demonstrate to a server system that that the printing device is entitled to invoke an aspect of a network service provided by the server system.

The credential 808 may represent, for example, any of the following:

1. A random number that is known by the server system and as a result can be verified by the server system when the credential is received.

2. A large number (e.g., a number that requires more than 2000 bits to represent) that is known by the server system and can therefore be verified by the server system when the credential is received.

3. A first and a second number. The first number being an encrypted version of the second number. The server system can use a private cryptographic key to decrypt the first number. The server system can then verify the credential by determining if the first number matches the second number.

4. Encrypted data that is encrypted using a private key of a public/private key pair. The server system uses the public key to verify the credential.

The memory 810 may represent any type of memory including, for example the following: a bar code, a magnetic media strip, a semiconductor memory, etc.

Figure 9:
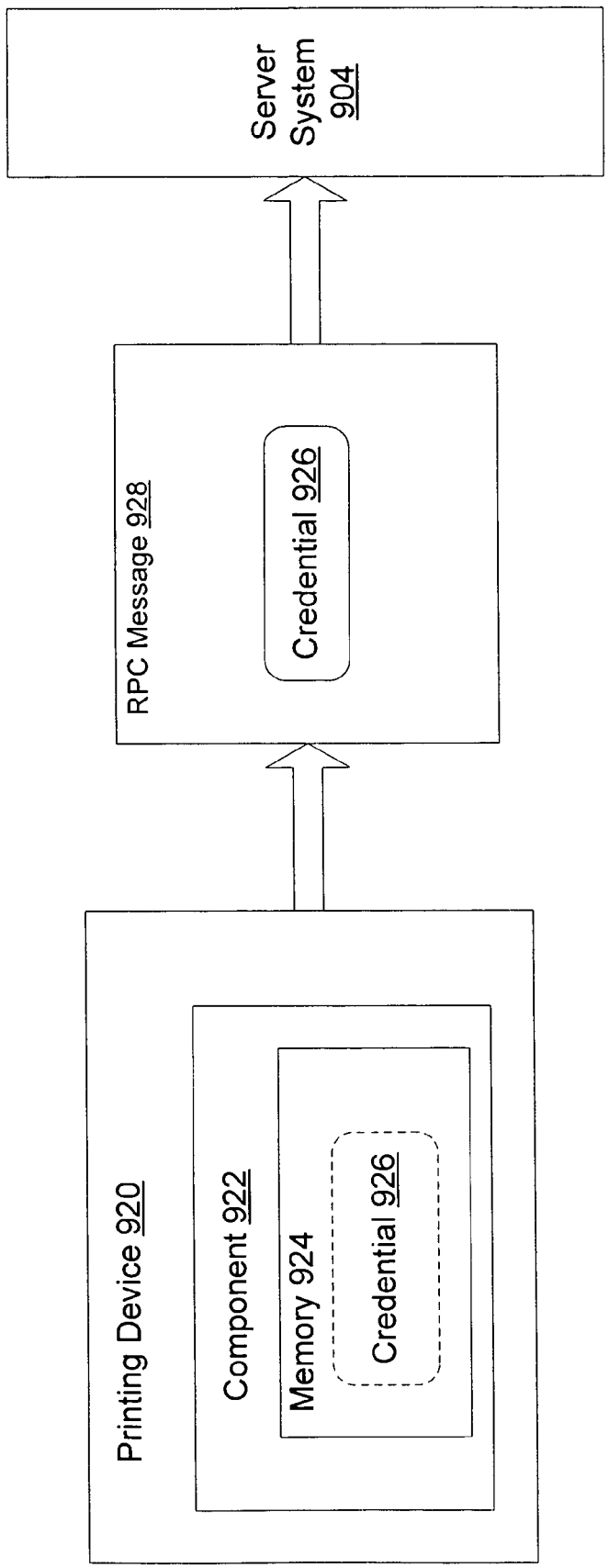
FIG. 9 is a high level block diagram of another computing system.

FIG. 9 illustrates another embodiment of the invention in the form of a computing system 902. The computing system 902 includes a printing device 920 that includes a component 922. The component includes a memory 924. The memory 924 stores a credential 926.

The printing device 920 is configured to automatically transmit a RPC message that specifies the credential 926 to the server system 904. In some embodiments, for example, the printing device 920 may transmit the RPC message in response to a detection of an internal signal that is generated by a sensor (e.g., a cartridge presence sensor, a toner level sensor, an ink level sensor, an environmental sensor, etc) located within the printing device 920. In other embodiments, the printing device 920 may transmit the RPC message in response to some externally generated signal. For example, the printing device 920 may be configured to transmit the RPC message in response to receiving a signal from an external computing device, such as another printing device or a host computer.

The credential 926 is used to demonstrate to the server system 904 that the printing device is authorized to invoke an aspect of a network service 904 provided by the server system 904.

It is further noted that the present invention may be embodied in the form of a "computer-readable medium". As used herein, the phrase "computer readable medium" can refer to any medium that can contain, store or propagate computer executable instructions. Thus, in this document, the phrase "computer-readable medium" may refer to a medium such as an optical storage device (e.g., a CD ROM) or a magnetic storage device (e.g., a magnetic tape). The phrase "computer-readable medium" may also refer to signals that are used to propagate the computer executable instructions over a network or a network system, such as the Public Internet.

Thus, a memory component (e.g., the server memory 404 or the printing device memory 506) that stores computer executable instructions (e.g., the server software module 408 or the firmware module 524) may represent an embodiment of the invention. Furthermore, signals used to propagate the firmware over a communication link (e.g. an intranet, Public Internet, etc) may also represent an embodiment of the invention.

Although several specific embodiments of the invention have been described and illustrated, the invention is not to be limited to specific forms or arrangements of parts so described and illustrated. The invention is limited only by the claims and the equivalents thereof.

What is claimed is:

1. A method of invoking a network service, the method comprising:
   transmitting, by a printing device, a remote procedure call (RPC) message to a server system that provides a network service;
   using the RPC message to determine if the printing device is an authorized printing device;
   invoking a reserved set of functions of the network service if the printing device is an authorized printing device; and
   invoking an alternate set of functions of the network service if the printing device is not an authorized printing device;
   wherein the RPC message includes data read from a memory that is an integrated part of a print cartridge installed in the printing device.

2. The method of claim 1, wherein the print cartridge contains toner or ink.

3. The method of claim 1, further comprising:
   reading, by the printing device, the data from the memory.

4. The method of claim 1, wherein the data is for demonstrating to the server system that provides the network service that the printing device is authorized to access the reserved set of functions.

5. The method of claim 1, wherein the data is for demonstrating that the printing device is authorized to access the reserved set of functions of the network service.

6. The method of claim 1, wherein the data describes a serial number of the print cartridge.

7. The method of claim 1, wherein the data demonstrates that the print cartridge is an authorized print cartridge.

8. The method of claim 1, further comprising:
   maintaining, by the server system, a record of a randomly generated number;
   wherein the maintaining step is performed prior to receiving the RPC message being transmitted.

9. The method of claim 1, wherein the data includes a randomly generated number and a print cartridge serial number each of which is uniquely assigned to the print cartridge and wherein the server system maintains a record of the randomly generated number and the print cartridge serial number.

10. The method of claim 9, wherein the data describes a large number that requires more than 2000 bits to represent and the server system maintains a copy of the large number.

11. The method of claim 1, wherein the data includes data encrypted using a private cryptographic key that is known to the server system.

12. The method of claim 11, wherein the encrypted data is uniquely assigned to the print cartridge through a serial number stored on the print cartridge and a copy of the encrypted data is available to the server system.

13. The method of claim 11, where the data that is encrypted is a cartridge serial number.

14. The method of claim 1, where the data includes data encrypted using a private cryptographic key of a public/private key pair and where the server system uses the public key of the public key pair to validate the encrypted data.

15. The method of claim 1, wherein the RPC message is in accordance with a version of the simple object access protocol (SOAP) and the RPC message is transmitted in accordance with a version of the hypertext transport protocol.

16. The method of claim 1, wherein the RPC message is in accordance with a version of SOAP, XML RPC, RMI, CORBA, DCOM, DCE RPC or MS RPC.

17. The method of claim 1, further comprising:
receiving, by the server system that provides the network service, the RPC message; and
processing, by the server system, the data read from the memory of the print cartridge to determine if the printing device is authorized to access the reserved set of functions of the network service.

18. The method of claim 1, further comprising:
if the printing device is determined to be authorized, then performing the reserved set of functions of the network service.

19. The method of claim 1, further comprising:
if the printing device is an authorized printing device, transmitting, by the server system, a reply to the printing device used to inform a user that the print cartridge is an authorized print cartridge.

20. In a printing device, a method comprising:
(a) displaying information regarding a network service;
(b) reading a credential from a memory of a print cartridge installed in the printing device; and
(c) transmitting a remote procedure call message to a network address to invoke the network service, including invoking a reserved set of functions of the network service if the credential demonstrates that the printing device is authorized to access the reserved set of functions, and invoking an alternate set of functions of the network service if the credential does not demonstrate that the printing device is authorized to access the reserved set of functions;
wherein the message includes the credential read from the memory of the print cartridge.

21. The method of claim 20, further comprising:
receiving a request from a user to invoke the network service; and
wherein the transmitting step is in response to receiving the request.

22. The method of claim 20, wherein the message is a SOAP message and the message is transmitted in accordance with HTTP.

23. The method of claim 20, further comprising:
if the credential demonstrates that the printing device is authorized to access the reserved set of functions, receiving a message at the printing device indicating that the print cartridge is an authorized print cartridge.

24. A printing device, comprising:
an input-out (I/O) port;
a mechanism to read data from a memory of an installed print cartridge; and
a control system configured to use the mechanism to read the data and to then transmit the data over the I/O port to a device in order to demonstrate to the device whether the printing device is authorized to invoke at least one function of the device,
wherein if the printing device is authorized, the at least one function of the device is invoked, and wherein if the printing device is not authorized, an alternate function of the device is invoked.

25. The printing device of claim 24, further comprising:
a printing mechanism that uses a print material contained in the print cartridge to place marks on a print medium.

26. The printing device of claim 24, wherein if the printing device is authorized, the printing device receives a reply used to inform a user that the print cartridge is an authorized print cartridge.

27. A printing device, comprising:
means for reading a credential from a memory of a print cartridge installed in the printing device;
means for transmitting a remote procedure call message including the credential to a server system;
means for invoking a reserved set of functions of a network service of the server system if the credential demonstrates that the printing device is authorized to invoke the reserved set of functions; and
means for invoking an alternate set of functions of the network service if the credential does not demonstrate that the printing device is authorized to invoke the reserved set of functions.

28. The printing device of claim 27, further comprising:
means for printing on a print media.

29. The printing device of claim 27, wherein the credential comprises a random number and the server system stores a copy of the random number.

30. The printing device of claim 27, further comprising:
means for informing a user that the print cartridge is an authorized print cartridge if the credential demonstrates that the printing device is authorized to invoke the reserved set of functions.

31. A method of authorizing a printing device to access an aspect of a network service, comprising:
(a) issuing a credential to a replacement component for a printing device;
(b) storing the credential in a memory of the replacement component;
(c) installing the replacement component into the printing device;
(d) transmitting, by the printing device, a remote procedure call message including the credential to a server system; and
(e) using the credential by the server system to determine if an originator of the message is authorized to access an aspect of a network service provided by the server system,
wherein if the originator is authorized, invoicing the aspect of the network service, and wherein if the originator is not authorized, invoking another aspect of the network service.

32. The method of claim 31, wherein the replacement component is a print cartridge.

33. The method of claim 31, wherein the credential issuing step includes generating a random number; and the credential includes the random number.

34. The method of claim 31, wherein if the originator is authorized, transmitting, by the server system, a reply to the printing device used to inform a user that the replacement component is an authorized replacement component.

35. A print cartridge, comprising:
a mechanism for enabling a printing device to demonstrate to a server system that the printing device is authorized to invoke at least one function of a network service provided by the server system,
wherein if the printing device is authorized, the at least one function of the network service is invoked, and
wherein if the printing device is not authorized, another function of the network service is invoked.

36. The print cartridge of claim 35, further comprising:
a housing; and
a print material contained within the housing;
wherein the mechanism is attached to the housing.

37. The print cartridge of claim 36, wherein the print material is dry toner.

38. The print cartridge of claim 36, wherein the print material is liquid toner.

39. The print cartridge of claim 36, wherein the print material is ink.

40. The print cartridge of claim 35, wherein the mechanism is a memory that stores a print cartridge credential, wherein the print cartridge credential enables the printing device to access the at least one function of the network service.

41. The print cartridge of claim 40, wherein the print cartridge credential includes a serial number of the print cartridge and a random number.

42. In a server system, a method comprising:
receiving a remote procedure call message that specifies a first credential issued to a print cartridge; and
using the credential included in the message to determine if an originator of the message is authorized to invoke at least one function of a network service provided by the server system, including invoking the at least one function of the network service if the originator is authorized, and invoking an alternate function of the network service if the originator is not authorized.

43. The method of claim 42, further comprising:
maintaining a plurality of records each specifying a different credential issued to a different print cartridge; and
wherein the using step includes the following substeps:
determining if one of the records specify the first credential; and
determining that the originator of the message is not authorized to invoke the at least one function if none of the plurality of records specify the first credential.

44. The method of claim 42, further comprising:
maintaining a message history database; and
wherein the using step uses information included in the message history database to determine if the credential has been compromised.

45. The method of claim 44, wherein the information included in the message history database indicates the number of different printing devices that have transmitted the same credential to the server system.

46. The method of claim 42, further comprising:
if the originator is authorized, transmitting a reply used to inform a user that the print cartridge is an authorized print cartridge.

47. A system, comprising:
a printing device that includes a print cartridge, where the print cartridge includes a memory that stores a credential issued to the print cartridge; and
a server system that provides a network service;
wherein the printing device is configured to transmit a remote procedure call message that specifies the credential to the server system;
wherein the server system is configured to use the credential included in the message to determine if the printing device is authorized to access at least one function of the network service; and
wherein the at least one function of the network service is invoked if the printing device is authorized, and wherein an alternate function of the network service is invoked if the printing device is not authorized.

48. The system of claim 47, wherein if the printing device is authorized, the server system is configured to transmit a reply to the printing device used to inform a user that the print cartridge is an authorized print cartridge.

49. A non-transitory computer-readable medium containing computer-executable instructions that, when executed by a computer, perform the following steps:
receiving a remote procedure call message from a printing device, the message specifying information obtained from a print cartridge installed in the printing device;
using the information to determine if the printing device is authorized;
invoking an aspect of a network service if the printing device is detei mined to be authorized; and
invoking an alternate aspect of the network service if the printing device is not determined to be authorized.

50. The non-transitory computer-readable medium of claim 49, wherein the network service aspect directs the printing device to display a message.

51. The non-transitory computer-readable medium of claim 49, wherein the network service aspect, upon being invoked, causes the printing device to display a message that informs the user that the print cartridge originated with a particular supplier entity.

* * * * *

UNITED STATES PATENT AND TRADEMARK OFFICE
CERTIFICATE OF CORRECTION

PATENT NO.       : 8,587,798 B2
APPLICATION NO.  : 10/903157
DATED            : November 19, 2013
INVENTOR(S)      : Shell S. Simpson et al.

It is certified that error appears in the above-identified patent and that said Letters Patent is hereby corrected as shown below:

In the Claims

In column 12, line 2, in Claim 24, delete "input-out" and insert -- input-output --, therefor.

In column 12, line 59, in Claim 31, delete "invoicing" and insert -- invoking --, therefor.

In column 14, line 40, in Claim 49, delete "detei mined" and insert -- determined --, therefor.

Signed and Sealed this
Eleventh Day of March, 2014

Michelle K. Lee
*Deputy Director of the United States Patent and Trademark Office*